(12) United States Patent
Jones et al.

(10) Patent No.: US 9,586,079 B1
(45) Date of Patent: Mar. 7, 2017

(54) EXERCISE APPARATUS HAVING GUIDED FOOT PAD CARRIERS

(71) Applicant: TCDP, LLC, Huntington Beach, CA (US)

(72) Inventors: Thomas Gilbert Jones, Huntington Beach, CA (US); Scott Lee, Pomfret Center, CT (US)

(73) Assignee: TCDP, LLC, Huntington Beach, CA (US)

(*) Notice: Subject to any disclaimer, the term of this patent is extended or adjusted under 35 U.S.C. 154(b) by 0 days.

(21) Appl. No.: 14/754,444

(22) Filed: Jun. 29, 2015

Related U.S. Application Data

(63) Continuation-in-part of application No. 14/304,886, filed on Jun. 14, 2014.

(51) Int. Cl.
  *A63B 21/00* (2006.01)
  *A63B 21/055* (2006.01)
  *A63B 23/04* (2006.01)

(52) U.S. Cl.
  CPC ...... *A63B 21/0552* (2013.01); *A63B 21/1465* (2013.01); *A63B 21/1488* (2013.01); *A63B 23/04* (2013.01); *A63B 2208/0204* (2013.01)

(58) Field of Classification Search
  CPC .................................................. A63B 21/00
  USPC .................. 482/51, 70, 121, 52, 71, 74
  See application file for complete search history.

(56) References Cited

U.S. PATENT DOCUMENTS

| | | | | |
|---|---|---|---|---|
| 4,653,749 A | * | 3/1987 | Rorabaugh | A63B 69/182 482/114 |
| 5,833,584 A | * | 11/1998 | Piaget | A63B 22/0012 482/51 |
| 6,302,830 B1 | * | 10/2001 | Stearns | A63B 22/205 482/51 |
| 2012/0053019 A1 | * | 3/2012 | Reyes | A63B 21/00069 482/52 |

* cited by examiner

*Primary Examiner* — Jerome w Donnelly
(74) *Attorney, Agent, or Firm* — Barcelo, Harrison & Walker, LLP

(57) ABSTRACT

An apparatus for human exercise in certain configurations includes first and second foot pads attached to first and second guided carrier members, respectively. A first curved guide rail portion is coupled to the first guided carrier member, and prevents motion of the first guided carrier member except for translation along the first curved guide rail portion. A second curved guide rail portion is coupled to the second guided carrier member, and prevents motion of the second guided carrier member except for translation along the second curved guide rail portion. A first motion resistor is coupled to the first foot pad and opposes a translation of the first foot pad along the first curved guide rail portion. Each of the first curved guide rail portion and the second curved guide rail portion is curved away from an underlying ground plane, to define a distally increasing rail height.

22 Claims, 10 Drawing Sheets

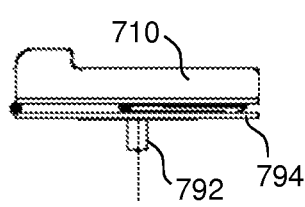
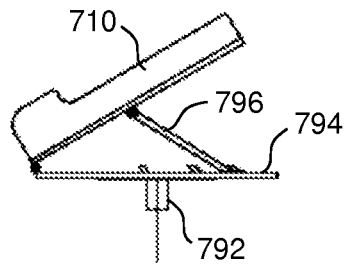
FIG. 7A  FIG. 7B
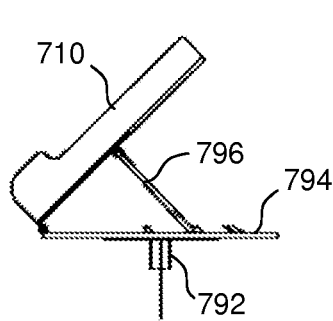
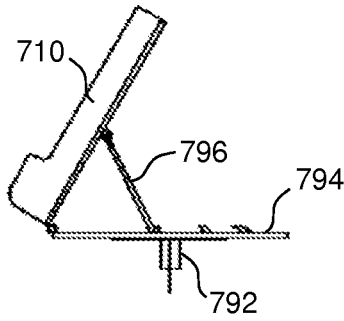
FIG. 7C  FIG. 7D

EXERCISE APPARATUS HAVING GUIDED FOOT PAD CARRIERS

This application claims priority under 35 U.S.C. §120 as a continuation-in part to pending U.S. patent application Ser. No. 14/304,886 filed on 2014 Jun. 14, entitled "Exercise Apparatus Having Guided Foot Pad Carriers," which is hereby incorporated by reference.

BACKGROUND

There are hundreds of different muscles in the human body, and a plethora of other connective tissues and anatomical structures for which exercise and stretching may improve strength and/or mobility. Different stretches or exercises may benefit different subsets of these muscles and connective tissues, with tens of thousands of combinations being possible. Moreover, human fitness can be defined or measured in various ways, many of which are personal and subjective to the exercise apparatus user. Hence, subtle differences in an exercise apparatus may unpredictably change the commercial or practical success of the apparatus.

Many contemporary exercise machines focus on muscle groups that are already well developed in the average user. Other contemporary exercise machines may focus on often under-developed muscle groups, but may invite injury by presenting too much or too little resistance to motion, and/or too easily allow over-stretching of muscles or connective tissue. Other contemporary exercise machines may avoid one or more of the foregoing pitfalls, but at a cost or with complexity that inhibits market acceptance.

Hence there is an ongoing substantial need in the art for improved exercise apparatus designs that can safely improve strength and/or flexibility of connective tissue and muscle combinations that are often under-developed in the average human, with adequate service life and reliability, and that can be practically manufactured at a cost that allows marketability at a profit.

BRIEF DESCRIPTION OF THE DRAWINGS

FIG. 7A is a side view of a tilting foot pad assembly for use with certain embodiments of the present invention, in a non-tilted 0° position.

FIG. 7B is a side view of the tilting foot pad assembly of FIG. 7A, in a 30° tilted position.

FIG. 7C is a side view of the tilting foot pad assembly of FIG. 7A, in a 45° tilted position.

FIG. 7D is a side view of the tilting foot pad assembly of FIG. 7A, in a 60° tilted position.

DESCRIPTION OF THE PREFERRED EMBODIMENTS

Figure 1A:
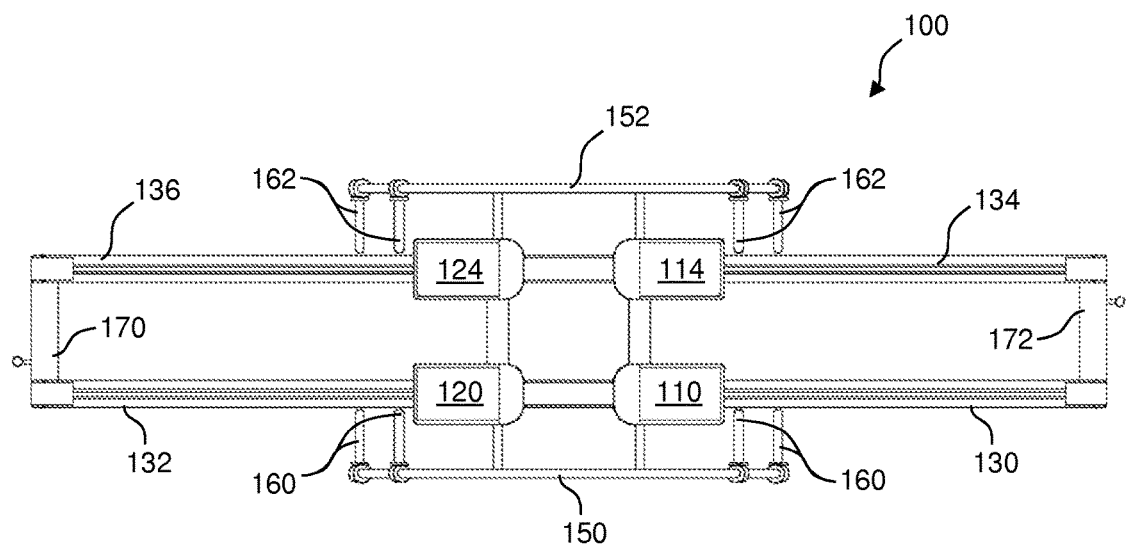
FIG. 1A is a top view of an apparatus for human exercise according to an example embodiment of the present invention.
Figure 1B:
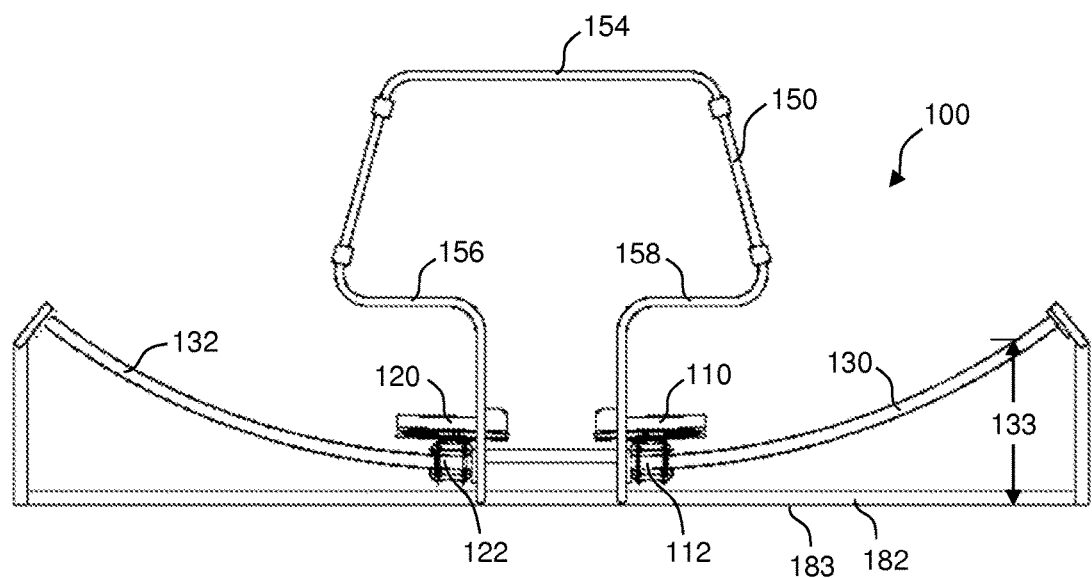
FIG. 1B is a side view of the apparatus of FIG. 1A.
Figure 1C:
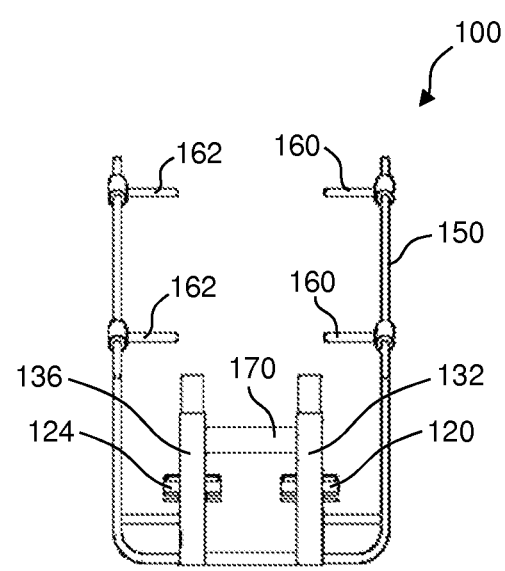
FIG. 1C is an end view of the apparatus of FIGS. 1A and 1B.

FIG. 1A is a top view of an apparatus 100 for human exercise according to an example embodiment of the present invention, which may safely improve strength and/or flexibility of connective tissue and muscle combinations that are often under-developed in the average human user. FIG. 1B is a side view of the apparatus 100, and FIG. 1C is an end view of the apparatus 100. In the embodiment of FIG. 1B, the apparatus 100 includes a first foot pad 110 attached to a first guided carrier member 112, and a second foot pad 120 attached to a second guided carrier member 122. In this context, the first and second foot pads 110, 120 need not be soft or include a cushion to be referred to herein as a pad; rather, the first and second foot pads 110, 120 may be hard foot pedals.

In the embodiment of FIGS. 1A-C, the apparatus 100 includes curved guide rails 130 and 132, coupled to the first and second guided carrier members 112, 122, respectively. In certain embodiments, the curved guide rails 130, 132 may be contiguously joined so that they are merely portions of the same longer rail. Functionally, the curved guide rails 130 and 132 substantially prevent displacement of the first and second guided carrier members 112, 122 except for translation along the curved guide rails 130, 132, respectively. Each of the first curved guide rail 130 and the second curved guide rail 132 is shown in FIG. 1B to be curved away from an underlying ground plane 183, so that a guide rail height 133 increases distally (as does the guide rail slope). Therefore, the guide rail height 133 is greater at the distal ends of the curved guide rails 130, 132, than at the proximal ends (i.e. near the middle of the apparatus 100), with a concavity facing upwards. In certain applications of the apparatus 100, the curvature of the guide rails 130, 132 that is shown in FIG. 1B may advantageously improve body kinematics during certain exercises (for example, several exercises that involve hip rotation and leg extension).

As shown in the embodiment of FIG. 1A, the apparatus 100 may optionally also include a third foot pad 114 and a fourth foot pad 124. The apparatus 100 may also optionally include curved guide rails 134 and 136 (curved out of the plane of the paper in the drawing of FIG. 1A) that substantially prevent displacement of the third and fourth foot pads 114, 124, except for translation along the curved guide rails 134, 136, respectively. In certain embodiments, the optional addition of the third and fourth foot pads 114, 124, and their corresponding guide rails 134 and 136, may allow additional exercises to be performed, such as abdominal exercises that may be facilitated by a user placing hands on two of the foot pads (e.g. either 110 and 114, or 120 and 124) and feet on the other two foot pads (e.g. either 110 and 114, or 120 and 124).

In the embodiment of FIGS. 1A-C, the exercise apparatus 100 includes a first handle frame 150 and a second handle frame 152. In certain applications, the user of the apparatus 100 may grasp the first handle frame 150 or the second handle frame 152, or both, for body support while accomplishing an exercise involving the foot pads 110 and 120, or 114 and 124. The first handle frame 150 may extend vertically from the curved guide rails 130, 132, and the second handle frame 152 may extend vertically from the curved guide rails 134, 136, for example.

As shown in FIG. 1B, the first handle frame 150 may include horizontal handlebar portions 154, 156, 158, for supporting body weight of the user, for example by grasping with the hand or leaning contact with another portion of the body. In addition, the first handle frame 150 may optionally include a plurality of protruding hand grips 160, that may be fixed to the first handle frame 150, or may be conventionally configured to fold or rotate into a stowed position when use is not desired. Likewise, the second handle frame 152 may optionally include a plurality of similarly protruding hand grips 162.

In certain embodiments, the first handle frame 150 may optionally include a plurality of conventional anchors (e.g. hooks, eyelets, etc) for selectively attaching elastic members, for example to facilitate the performance of various conventional upper body exercises in conjunction with other uses of the exercise apparatus 100. Such elastic members may be conventional bungee cords with handles at each end (not shown), for enabling upper body (e.g. arm) exercise—optionally simultaneously with user operation of the foot pads 110, 120. In certain embodiments, the second handle frame 152 may have similar conventional anchors.

In the embodiment of FIG. 1B, the first handle frame 150 is optionally fixed to a horizontal base member 182 disposed below the first and second foot pads 110, 120 of the exercise apparatus 100. However, in an alternative embodiment the first handle frame 150 may optionally be adjustable in height by a conventional means (e.g. a pin and series of through holes). In certain embodiments, the first handle frame 150 may optionally also include a seat to support a human user of the apparatus 100 in a sitting position with her feet in contact with the first and second foot pads 110, 120.

In the embodiment of FIGS. 1A-C, the apparatus 100 includes a first transverse spacer 170 and a second transverse spacer 172. As shown in FIGS. 1A-C, the transverse spacer 170 may be oriented horizontally and transverse to the curved guide rails 132, 136. Likewise, the transverse spacer 172 may be oriented horizontally and transverse to the curved guide rails 130, 134.

Figure 2:
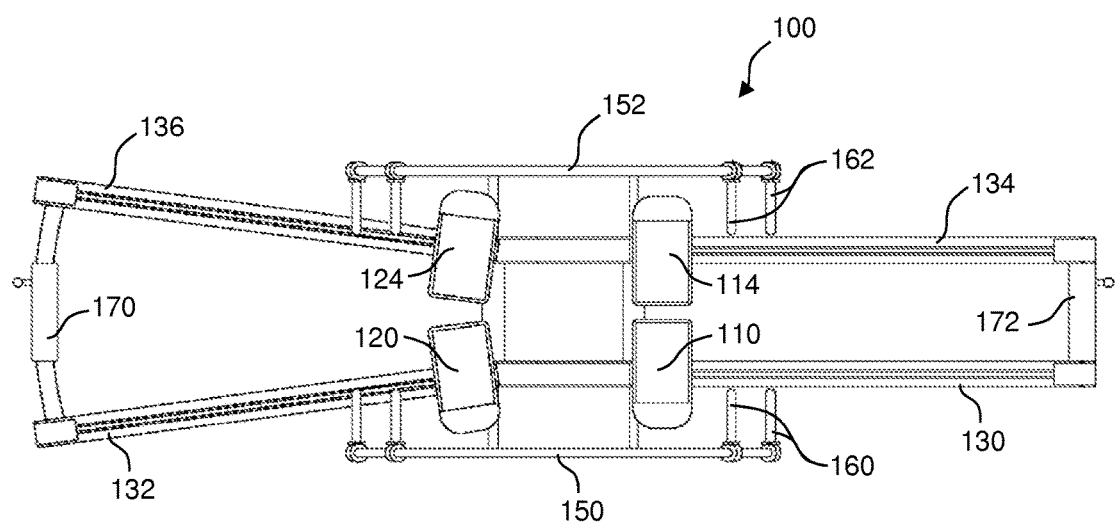
FIG. 2 is a top view of the apparatus of FIG. 1A, in another configuration.

FIG. 2 is a top view of the apparatus 100, in an alternative configuration. As shown in the example of FIG. 2, the first transverse spacer 170 may optionally be of telescopic construction, to allow adjustable extension to increase the lateral spacing between the distal ends of the curved guide rails 132, 136. In certain applications, the adjustable divergence of the curved guide rails 132, 136 to selected increased lateral spacings, may facilitate various degrees of abduction during exercise. Likewise, the second transverse spacer 172 may optionally be of telescopic construction, to allow adjustable extension to increase the lateral spacing between the distal ends of the curved guide rails 130, 134. However, in FIG. 2 the second transverse spacer 172 is shown in an optionally fully collapsed configuration (i.e. minimum spacing between the distal ends of the curved guide rails 130, 134).

Figure 3:
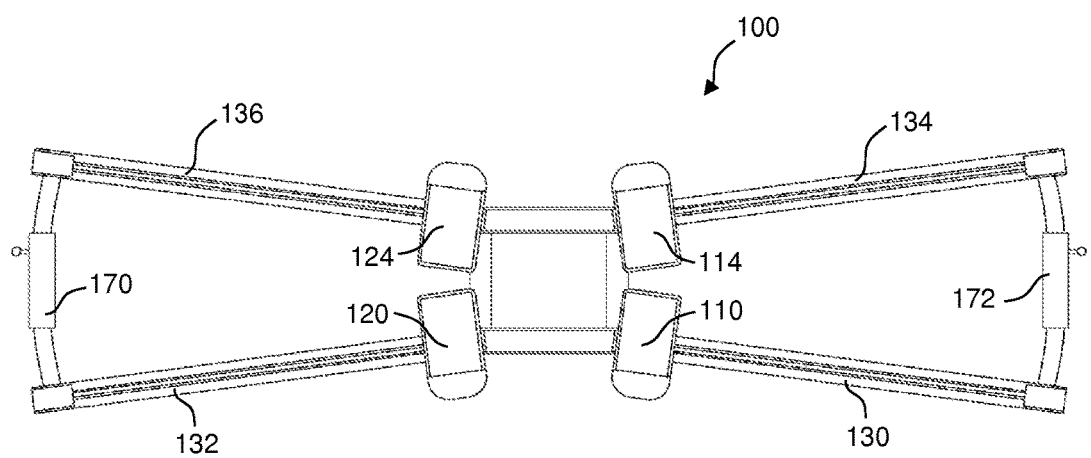
FIG. 3 is a top view of the apparatus of FIG. 1A, in another configuration and without handle frames.

FIG. 3 depicts the apparatus 100 without the optional first and second handle frames, and with the second transverse spacer 172 shown in an optionally extended configuration to adjustably increase the spacing between the distal ends of the curved guide rails 130, 134. In certain embodiments, the angular divergence of the guide rails caused by extending the first or second transverse spacers may provide improved body kinematics during certain exercises that employ a selected pair of the foot pedals 110, 114, 120, or 124.

In certain embodiments, the first and second foot pads 110, 120 may each optionally be pivotably attached to the first and second guided carrier members 112, 122, respectively, by conventional swivel attachments. In certain embodiments, each of the first and second guided carrier members 112, 122 may optionally include conventional torsional elastic members (e.g. torsional springs) that apply restoring torques to the first and second foot pads 110, 120, respectively. In this context, applying a restoring torque means that if/when the user pivots the foot pad 110 or 120 from a rest angular position, the conventional torsional elastic member torques that foot pad in an opposite sense to tend to return that foot pad to the rest angular position. This may provide an advantageous exercise or stretching resistance to the user of the apparatus 100.

Note that in FIGS. 2 and 3, the foot pads 110, 114, 120, and 124 are optionally pivoted to an orientation that is transverse to the corresponding guide rail 130, 134, 132, and 136. By contrast, FIG. 1A depicts the foot pads 110, 114, 120, and 124 being optionally pivoted to an orientation that is parallel to the corresponding guide rail 130, 134, 132, and 136. In certain applications, such optional ability of the foot pads to pivot may facilitate certain exercises or a greater variety of exercises. For example, the transverse orientation of FIGS. 2 and 3 may facilitate exercise of the user's body in a sideways axis, with the primary movement being in the frontal plane, and while introducing vertical movement and various degrees of flexion and extension. By contrast, the parallel orientation of FIG. 1A may facilitate exercise of the user's body in a forward and backward axis, with the primary movement being in the sagittal plane, and while introducing vertical movement and various degrees of abduction.

Figure 4A:
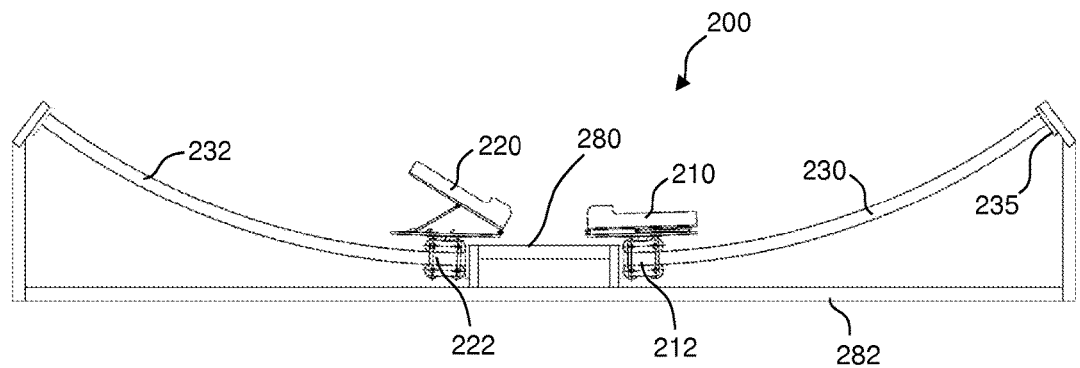
FIG. 4A is a side view of an apparatus for human exercise according to another example embodiment of the present invention.
Figure 4B:
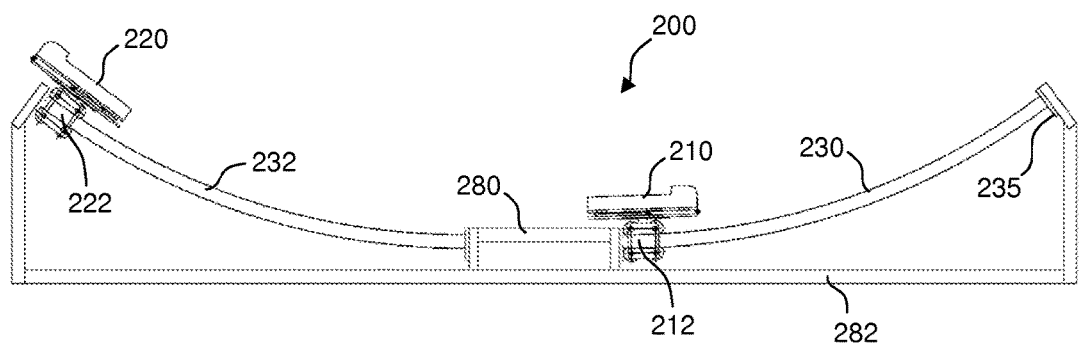
FIG. 4B depicts the apparatus of FIG. 4A in a different configuration.

FIG. 4A is a side view of an apparatus 200 for human exercise according to another example embodiment of the present invention. In the embodiment of FIG. 4A, the apparatus 200 includes a first foot pad 210 attached to a first guided carrier member 212, and a second foot pad 220 attached to a second guided carrier member 222. FIG. 4B depicts the apparatus 200 with the foot pads 210 and 220 in a different configuration.

In the embodiment of FIGS. 4A-B, the apparatus 200 includes curved guide rails 230 and 232, coupled to the first and second guided carrier members 212, 222, respectively. The curved guide rails 230 and 232 substantially prevent displacement of the first and second guided carrier members 212, 222 except for translation along the curved guide rails 230, 232, respectively. In certain applications of the apparatus 200, the curvature of the guide rails 230, 232 that is shown in FIGS. 4A-B may advantageously improve body kinematics during certain exercises (for example, several exercises that involve hip rotation and leg extension).

In certain embodiments, an impact dampening layer or other conventional shock absorbing mechanism may be placed at either or both ends of the curved guide rails 230, 232, to reduce the severity of impacts at the limits of foot pad travel. For example, as shown in FIGS. 4A-B, the curved guide rail 230 may optionally include an impact dampening end plate 235 (e.g. having a viscoelastic damping layer disposed thereupon) at one of the limits of travel of the first guided carrier member 212.

Optionally, the apparatus 200 may further include a stationary foot platform 280 that does not translate and that is fixed to a horizontal base member 282 between the first and second foot pads 210, 220. Optionally the horizontal base member 282 may include a downward facing conventional polymer traction grip for increasing friction with an underlying floor or ground surface upon which the apparatus 200 rests.

In certain embodiments, the first and second guided carrier members 212, 222 may optionally include a conventional locking mechanism for selectively immobilizing the first or second guided carrier member 212, 222 with respect to the curved guide rails 230, 232. For example, such a conventional locking mechanism may comprise a pin insertable into a hole through the first or second guided carrier member 212, 222 and into the curved guide rails 230, 232. In certain embodiments, the optional stationary foot platform 280, or the optional locking of the first and second guided carrier members 212, 222, may facilitate certain single-leg exercises or stretches.

In the configuration of FIG. 4B, the second foot pad 220 and its guided carrier member 222 have translated leftward along the curved guide rail 232, to a position that is leftward of its position in the configuration of FIG. 4A. In the configuration of FIG. 4B, the first foot pad 210 and its guided carrier member 212 have not translated along the guide rail 230 relative to its position in the configuration of FIG. 4A. However, in the configuration of FIG. 4B, each of the first foot pad 210 and the second foot pad 220 has been pivoted one-half turn (e.g. by the user) relative to its angular position in the configuration of FIG. 4A. Note also that the second foot pad 220 is in a tilted configuration in FIG. 4A, with such tilt being collapsed in the configuration of FIG. 4B. An example mechanism for the tilting of foot pads is described subsequently herein.

Figure 5A:
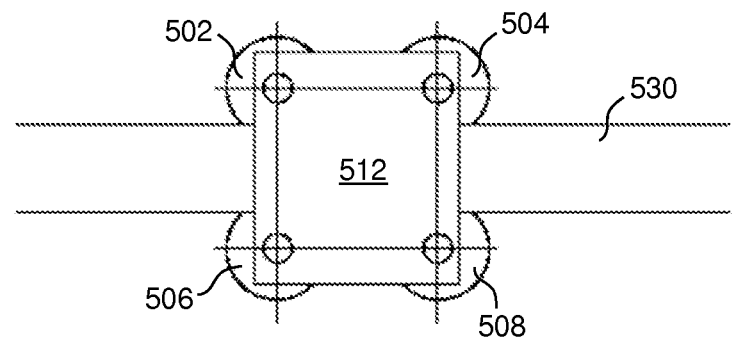
FIG. 5A is a side view of an example rolling guided carrier member for guiding a foot pad along a guide rail, according to certain embodiments of the present invention.
Figure 5B:
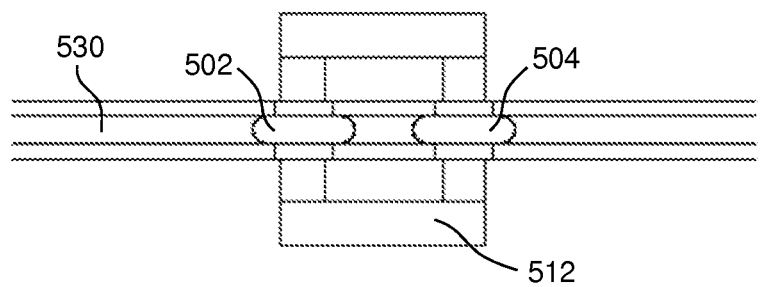
FIG. 5B is a top view of the example rolling guided carrier member of FIG. 5A.

FIG. 5A is a side view of an example rolling guided carrier member 512 for guiding a foot pad along a guide rail 530, according to certain embodiments of the present invention. FIG. 5B is a top view of the example rolling guided carrier member 512. In the embodiment of FIGS. 5A-B, the rolling guided carrier member 512 includes four rollers 502, 504, 506, 508 that may contact the guide rail 530 to substantially prevent motion of the rolling guided carrier member 512 except for translation along the guide rail 530.

Figure 6:
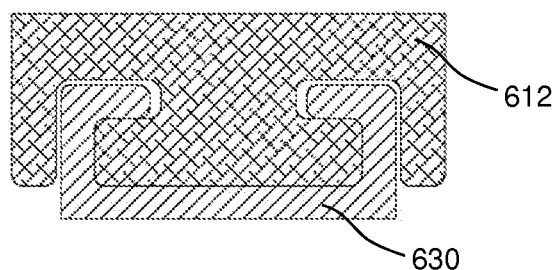
FIG. 6 is a cross-sectional view of an example sliding guided carrier member for guiding a foot pad along a guide rail, according to certain embodiments of the present invention.

FIG. 6 is a cross-sectional view of an example sliding guided carrier member 612 for guiding a foot pad along a guide rail 630, according to certain embodiments of the present invention. In the embodiment of FIG. 6, the sliding guided carrier member 612 comprises a slider (e.g. a hard polymer block) that slides within a groove in the guide rail 630, to substantially prevent motion of the sliding guided carrier member 612 except for translation along the guide rail 630.

FIG. 7A is a side view of a tilting foot pad assembly 710 for use with certain embodiments of the present invention, in a non-tilted 0° position. FIG. 7B is a side view of the tilting foot pad assembly 710 in a 30° tilted position. FIG. 7C is a side view of the tilting foot pad assembly 710 in a 45° tilted position. FIG. 7D is a side view of the tilting foot pad assembly 710 in a 60° tilted position. In certain applications, the foregoing tilted positions may advantageously help the exercising user to achieve a neutral or various non-neutral plantar flexion positions.

In each of the tilted positions shown in FIGS. 7B-D, the desired tilting is optionally accomplished by engagement of a hinged plate 796 with a selected one of a plurality of plate stops in or on a foot pad base 794. In the non-tilted position shown in FIG. 7A, the hinged plate is collapsed without engagement with any of the plate stops of the foot pad base 794. Note that the foot pad assembly 710 optionally may include a downwardly protruding pivot post 792 for rotatable engagement with a receiving bore in an underlying guided carrier member.

Figure 8:
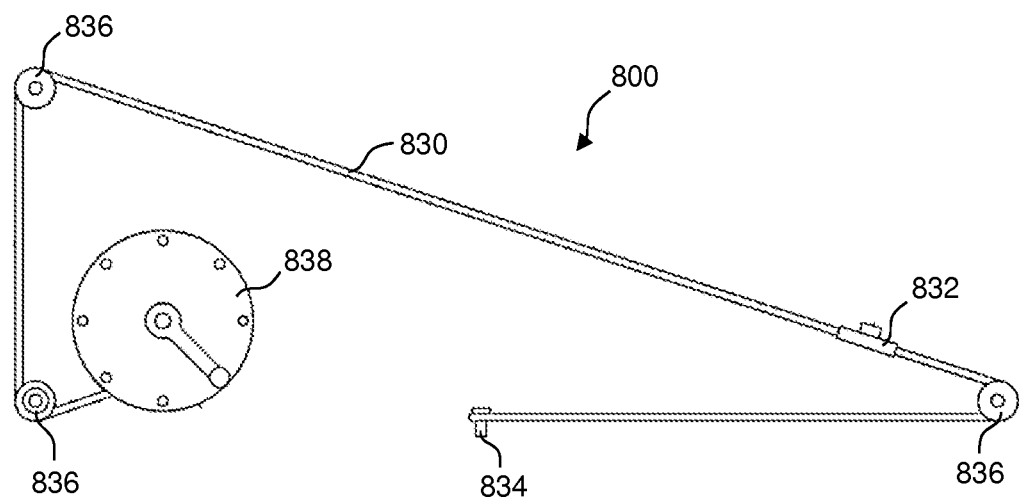
FIG. 8 is a schematic representation of an elastic system for resisting motion of a foot pedal along a guide rail, in certain embodiments of the present invention.

FIG. 8 is a schematic representation of a motion resistor system 800 for resisting motion of a foot pedal along a guide rail, according to certain embodiments of the present invention. In the embodiment of FIG. 8, the motion resistor system 800 includes a first elastic member 830 (e.g. a spring or bungee), extending from an anchor 834 to an adjustable tensioning mechanism 838. The adjustable tensioning mechanism 838 may optionally comprise a conventional ratcheted spool that is turned by handle, for example. An elastic coefficient of the first elastic member 830 may be expressed as the ratio of tension force to stretch distance from its free state, and can be conventionally controlled, for example by the choice of material and diameter of the first elastic member 830, and the setting of the tensioning member 838.

A plurality of pulleys 836 may guide the first elastic member 830 into any desired path or shape. For example, a triangular path is shown in FIG. 8, but with a sufficient number of pulleys 836, the path of the first elastic member 830 may be controlled to advantageously follow the curvature of a curved guide rail (e.g. curved guide rail 132 of FIG. 1B).

Still referring to FIG. 8, an optional latching device 832 may be used to attach a guided carrier member to the first elastic member 830, for example to provide elastic resistance to movement of a foot pad along a guide rail to increase muscle fatigue during exercise. Preferably, but not necessarily, the latching device 832 may be disengaged from or reengaged with the first elastic member 830 anywhere along the length of the first elastic member, to adjust the neutral (i.e. zero force) position of an attached foot pad in certain embodiments. In certain embodiments, more than one latching device (and more than one foot pad) may be coupled to the first elastic member 830. Alternatively, additional elastic members may be incorporated into the motion resistor system (e.g. one elastic member per foot pad).

Alternatively, resistance to movement of a foot pad along a guide rail (to increase muscle fatigue during exercise) may be accomplished by friction between a sliding guided carrier member and a guide rail (e.g. friction between the sliding guided carrier member 612 and the guide rail 630 of FIG. 6). Such a sliding guided carrier member 612 may be referred to as a slider herein. In certain alternative embodiments, resistance to movement of a foot pad along a guide rail (to increase muscle fatigue during exercise) may be otherwise conventionally accomplished, such as by actively or passively controlled conventional magnetic, pneumatic, or hydraulic mechanisms.

Figure 9:
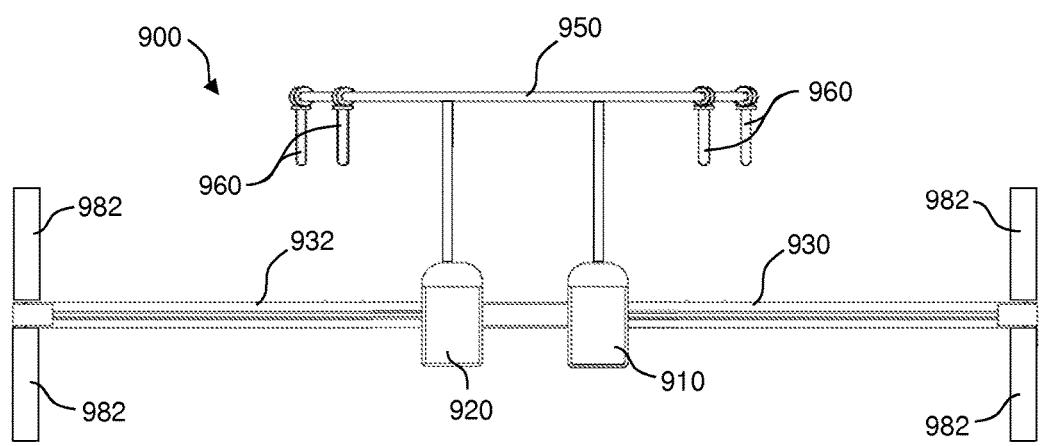
FIG. 9 is a top view of an apparatus for human exercise according to another example embodiment of the present invention.

FIG. 9 is a top view of an apparatus 900 for human exercise according to another example embodiment of the present invention, which may safely improve strength and/or flexibility of connective tissue and muscle combinations that are often under-developed in the average human user. In the embodiment of FIG. 9, the apparatus 900 includes a first foot pad 910 and a second foot pad 920 that are coupled to, and constrained to translate along, straight or curved guide rails 930 and 932, respectively.

In the embodiment of FIG. 9, the exercise apparatus 900 includes a first handle frame 950. In certain applications, the user of the apparatus 900 may grasp the first handle frame 950 for body support while accomplishing an exercise involving the foot pads 910 and 920. The first handle frame 950 may extend vertically from the straight or curved guide rails 930, 932. The first handle frame 950 may optionally include a plurality of protruding hand grips 960, that may be fixed to the first handle frame 950, or may be conventionally configured to fold or rotate into a stowed position when use is not desired.

In the embodiment of FIG. 9, the exercise apparatus 900 may include one or more horizontal base members 982 that may have a transverse orientation with respect to the straight or curved guide rails 930, 932. In certain embodiments, the horizontal base members 982 may improve the stability of the exercise apparatus 900 during use. Each of the horizontal base members 982 may optionally include a downward facing conventional polymer traction grip for increasing friction with an underlying floor or ground surface upon which the apparatus 900 rests.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. An apparatus for human exercise comprising:
    a first foot pad attached to a first guided carrier member, and a second foot pad attached to a second guided carrier member;
    a first curved guide rail portion coupled to the first guided carrier member, the first curved guide rail portion preventing motion of the first guided carrier member except for translation along the first curved guide rail portion;
    a second curved guide rail portion coupled to the second guided carrier member, the second curved guide rail portion preventing motion of the second guided carrier member except for translation along the second curved guide rail portion;
    a stationary foot platform that is fixed to the apparatus between the first curved guide rail portion and the second curved guide rail portion; and
    a first motion resistor coupled to the first foot pad and opposing a translation of the first foot pad along the first curved guide rail portion;
    wherein each of the first curved guide rail portion and the second curved guide rail portion is curved away from an underlying ground plane, to define a distally increasing rail height.

2. The apparatus of claim 1 wherein the first motion resistor comprises an elastic member coupled to the first foot pad.

3. The apparatus of claim 1 wherein the first motion resistor is further coupled to the second foot pad and opposes a translation of the second foot pad along the second curved guide rail portion.

4. The apparatus of claim 1 further comprising a second motion resistor coupled to the second foot pad and opposing a translation of the second foot pad along the second curved guide rail portion.

5. The apparatus of claim 1 wherein the first guided carrier member is a slider, and the first motion resistor comprises a frictional interface between the slider and the first curved guide rail portion.

6. The apparatus of claim 1 wherein first guided carrier member includes a plurality of wheels in contact with the first curved guide rail portion.

7. An apparatus for human exercise comprising:
    a first foot pad attached to a first guided carrier member, and a second foot pad attached to a second guided carrier member;
    a first curved guide rail portion coupled to the first guided carrier member, the first curved guide rail portion preventing motion of the first guided carrier member except for translation along the first curved guide rail portion;
    a second curved guide rail portion coupled to the second guided carrier member, the second curved guide rail portion preventing motion of the second guided carrier member except for translation along the second curved guide rail portion;
    a third foot pad attached to a third guided carrier member, and a fourth foot pad attached to a fourth guided carrier member;
    a third curved guide rail portion coupled to the third guided carrier member, the third curved guide rail portion preventing motion of the third guided carrier member except for translation along the third curved guide rail portion;
    a fourth curved guide rail portion coupled to the fourth guided carrier member, the fourth curved guide rail portion preventing motion of the fourth guided carrier member except for translation along the fourth curved guide rail portion;
    a third motion resistor coupled to the third foot pad and opposing a translation of the third foot pad along the third curved guide rail portion; and
    a first motion resistor coupled to the first foot pad and opposing a translation of the first foot pad along the first curved guide rail portion;
    wherein each of the first curved guide rail portion and the second curved guide rail portion is curved away from an underlying ground plane, to define a distally increasing rail height.

8. The apparatus of claim 7 wherein the third motion resistor comprises an elastic member coupled to the third foot pad.

9. The apparatus of claim 7 wherein the third motion resistor is further coupled to the fourth foot pad and opposes a translation of the fourth foot pad along the fourth curved guide rail portion.

10. The apparatus of claim 7 further comprising a fourth motion resistor coupled to the fourth foot pad and opposing a translation of the fourth foot pad along the fourth curved guide rail portion.

11. The apparatus of claim 7 wherein the third guided carrier member is a slider, and the third motion resistor comprises a frictional interface between the slider and the third curved guide rail portion.

12. The apparatus of claim 7 further comprising a first extendable transverse spacer between a distal end of the first curved guide rail portion and a distal end of the third curved guide rail portion.

13. The apparatus of claim 12 further comprising a second extendable transverse spacer between a distal end of the second curved guide rail portion and a distal end of the fourth curved guide rail portion.

14. The apparatus of claim 1 wherein the first foot pad defines a foot pad surface normal, and the first foot pad includes a hinge for tilting the foot pad surface normal relative to the underlying ground plane.

15. The apparatus of claim 1 wherein the first foot pad defines a foot pad surface normal, and the first foot pad includes a pivot for pivoting the first foot pad about the foot pad surface normal.

16. The apparatus of claim 15 wherein the first foot pad is pivotably attached to the first guided carrier member by the pivot.

17. The apparatus of claim 1 wherein the first guided carrier member includes a first locking mechanism for selectively immobilizing the first guided carrier member with respect to the first curved guide rail portion.

18. The apparatus of claim 1 wherein a rail height of the second curved guide rail portion decreases proximally towards the stationary foot platform.

19. The apparatus of claim 1 wherein the apparatus includes a polymer traction grip in contact with the underlying ground plane, for increasing friction with an underlying floor upon which the apparatus rests.

20. The apparatus of claim 1 further comprising a first handle frame disposed on a first side of the first and second curved guide rail portions, the first handle frame having a first handle frame maximum height that is at least three times a maximum of the distally increasing rail height.

21. An apparatus for human exercise comprising:
a first foot pad attached to a first guided carrier member, and a second foot pad attached to a second guided carrier member;
a first curved guide rail portion coupled to the first guided carrier member, the first curved guide rail portion preventing motion of the first guided carrier member except for translation along the first curved guide rail portion;
a second curved guide rail portion coupled to the second guided carrier member, the second curved guide rail portion preventing motion of the second guided carrier member except for translation along the second curved guide rail portion;
a first motion resistor coupled to the first foot pad and opposing a translation of the first foot pad along the first curved guide rail portion;
wherein each of the first curved guide rail portion and the second curved guide rail portion is curved away from an underlying ground plane, to define a distally increasing rail height;
a first handle frame disposed on a first side of the first and second curved guide rail portions, the first handle frame having a first handle frame maximum height that is at least three times a maximum of the distally increasing rail height, and
a second handle frame disposed on a second side of the first and second curved guide rail portions opposite the first side, the second handle frame having a second handle frame maximum height that is at least three times the maximum of the distally increasing rail height.

22. The apparatus of claim 20 wherein the first handle frame includes a first plurality of protruding handles.

* * * * *